(12) United States Patent
Kikuchi et al.

(10) Patent No.: US 6,384,577 B1
(45) Date of Patent: May 7, 2002

(54) ELECTRONIC APPARATUS INCLUDING REMOTE CONTROL RECEIVING SYSTEM AND AC ADAPTER SYSTEM

(76) Inventors: Masafumi Kikuchi; Tadashi Oomura; Genichiro Oga, all of c/o Sony Corporation 7-35, Kitashinagawa 6-chome, Shinagawa-Ku, Kanagawa (JP)

(*) Notice: Subject to any disclaimer, the term of this patent is extended or adjusted under 35 U.S.C. 154(b) by 0 days.

(21) Appl. No.: 09/717,090

(22) Filed: Nov. 22, 2000

(30) Foreign Application Priority Data

Nov. 30, 1999 (JP) .......................................... P11-339277

(51) Int. Cl.[7] ................................................. H02J 7/00
(52) U.S. Cl. ...................................... 320/134; 320/128
(58) Field of Search .................................. 320/134, 128, 320/135, 137

(56) References Cited

U.S. PATENT DOCUMENTS 4,771,312 A * 9/1988 Yanase et al. ................. 307/66
5,869,949 A * 2/1999 Nishikawa et al. .......... 320/101
5,889,382 A    3/1999 Jung ............................ 320/106
6,169,341 B1 * 1/2001 Nagai ........................... 320/135

FOREIGN PATENT DOCUMENTS

EP            0685975 A1      5/1995

* cited by examiner

Primary Examiner—Gregory Toatley
Assistant Examiner—Lawrence Luk
(74) Attorney, Agent, or Firm—Ronald P. Kananen, Esq.; Rader, Fishman & Grauer, PLLC (57) ABSTRACT

In a remote control receiving system of an electronic apparatus such as a television receiver, a charger is connected to the output terminal of a sub regulator for driving a load such as a microcomputer by using an AC power source as an energy source, and a charging switch is connected between the load and the charger, and thereby the charging switch is controlled to turn on or off by a comparator on the basis of the charged voltage in the charger.

3 Claims, 6 Drawing Sheets

| OPERATION MODE | POWER | COMP | μ-con | LED | SUB SW | MAIN SW | CHARGING SW |
|---|---|---|---|---|---|---|---|
| AT THE TIME OF NORMAL ON | OFF-ON | LOW | M | OFF | ON | ON | OFF-ON |
| M-OFF | OFF | HIGH-LOW | M | OFF | OFF | OFF | ON-OFF |
| AT THE TIME OF R-CHARGING | OFF→OFF-ON | HIGH-LOW LOW-HIGH | R R | ON ON | OFF→ON | OFF OFF | ON-OFF→OFF-ON |
| POWER FAILURE: POWER FAILURE AT THE TIME OF CHARGING | OFF→OFF | HIGH-LOW→LOW | R R-M | ON→ON-OFF | OFF→ON-OFF | OFF OFF | ON-OFF |
| POWER FAILURE: POWER FAILURE DURING CHARGING | OFF-ON ON-OFF | HIGH-LOW LOW-(HIGH) LOW | R R R-M | ON ON | OFF ON→ | OFF OFF | ON-OFF OFF-(ON)→ |

ELECTRONIC APPARATUS INCLUDING REMOTE CONTROL RECEIVING SYSTEM AND AC ADAPTER SYSTEM

BACKGROUND OF THE INVENTION

1. Field of the Invention

The present invention relates to an electronic apparatus including a remote control receiving system, an AC adapter system and so forth.

2. Description of the Related Art

Figure 4:
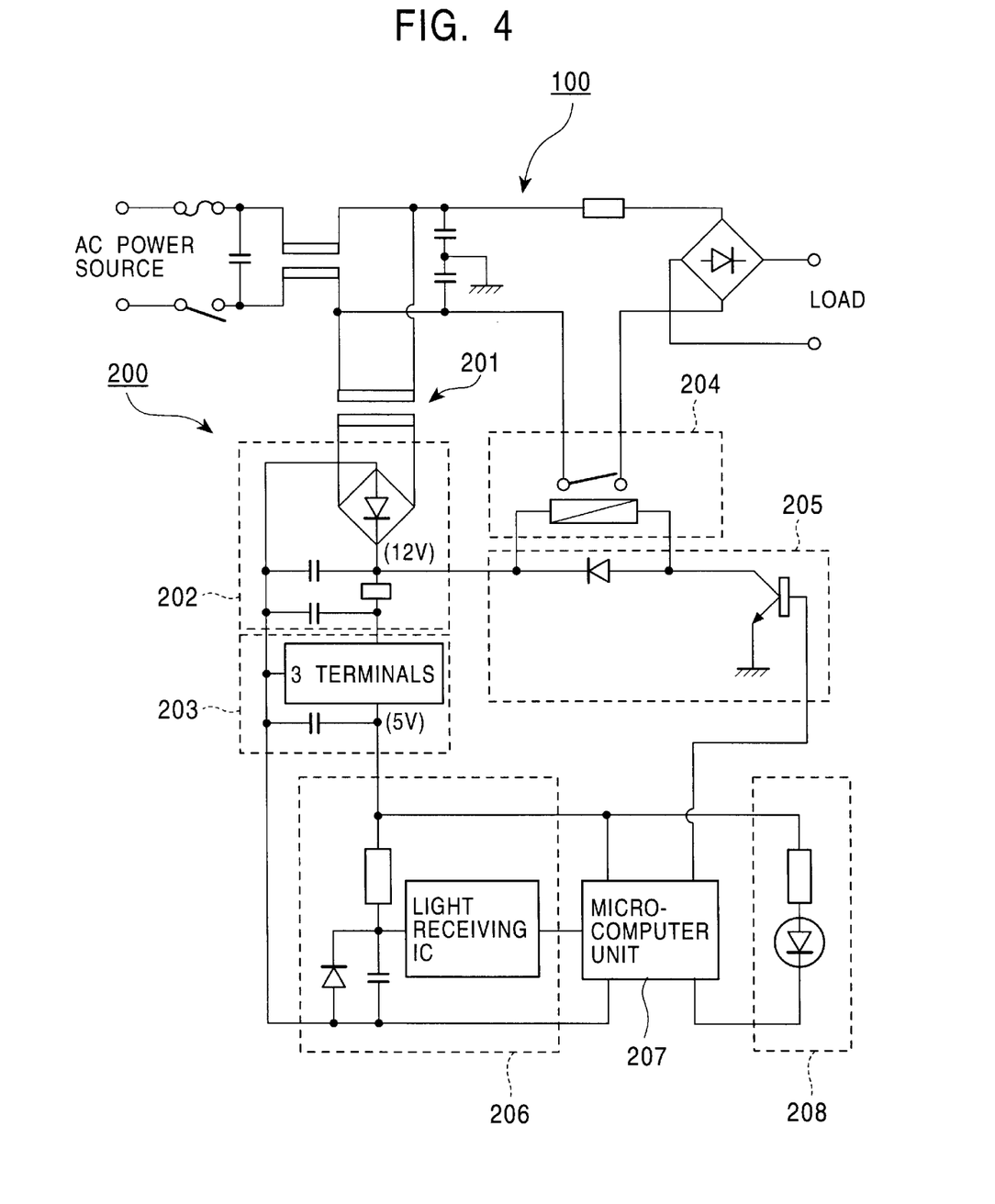
FIG. 4 is a block diagram showing a conventional remote control receiving system.

The structure of a conventional remote control receiving system is shown in FIG. 4. The conventional remote control receiving system includes a power source dedicated to a remote controller (hereafter called as "remote control power source") 200 independently of a system power source 100 for driving a load of a system (for example, a television receiver).

The remote control power source 200 is comprised of an isolation transformer 201, a rectifying unit 202 and a stabilized power source circuit unit 203. A DC voltage of, for example 12 V, obtained by the rectification of the rectifying unit 202 is supplied to a relay driving circuit unit 205 for driving a relay in an AC switch unit 204 as its operation voltage. Moreover, a DC voltage of, for example 5 V, obtained by the stabilization of the stabilized power source circuit unit 203 is supplied to a remote control light receiving unit 206, a microcomputer unit 207 and a standby display unit 208 as respective operation voltages.

However, not only the consumption electric power of the remote control light receiving unit 206, the microcomputer unit 207 and so forth, but also the reactive loss of the isolation transformer 201 are large in the conventional remote control receiving system structured as above. Consequently, the consumption electric power of the system is large, and the improvement in saving electric power at the time of stand-by for being remotely controlled is desired.

SUMMARY OF THE INVENTION

The present invention was made in consideration of the aforesaid problem, and aims to provide an electronic apparatus capable of saving electric power at the time of stand-by.

According to an aspect of the present invention, there is provided an electronic apparatus in a structure of comprising a regulator for driving a load connected to an output terminal of the regulator by using an AC power source as an energy source, a charger connected to the output terminal of the regulator, a charging switch connected between the load and the charger, and switch controlling means for monitoring a charged voltage in the charger to turn on the charging switch when the charged voltage reaches a prescribed voltage and turn off the charging switch when the charged voltage becomes less than the prescribed voltage.

When the charged voltage in the charger is less than the prescribed voltage in the electronic apparatus having the aforesaid structure, the switch controlling means turns off the charging switch. At this time, an operation voltage is supplied to the load from the regulator together with charging of the charger by the voltage of the regulator. And then, when the charged voltage in the charger reaches the prescribed voltage, the switch controlling means turns on the charging switch. Hereby, because the voltage in the charger is supplied to the load through the charging switch, the electric power consumption to the load on the side of the AC power source is suppressed.

BRIEF DESCRIPTION OF THE DRAWINGS

The above and other objects, features and a advantages of the present invention will become more apparent from the following description of the presently preferred exemplary embodiments of the invention taken in conjunction with the accompanying drawings, in which.

DESCRIPTION OF THE PREFERRED EMBODIMENTS

Figure 1:
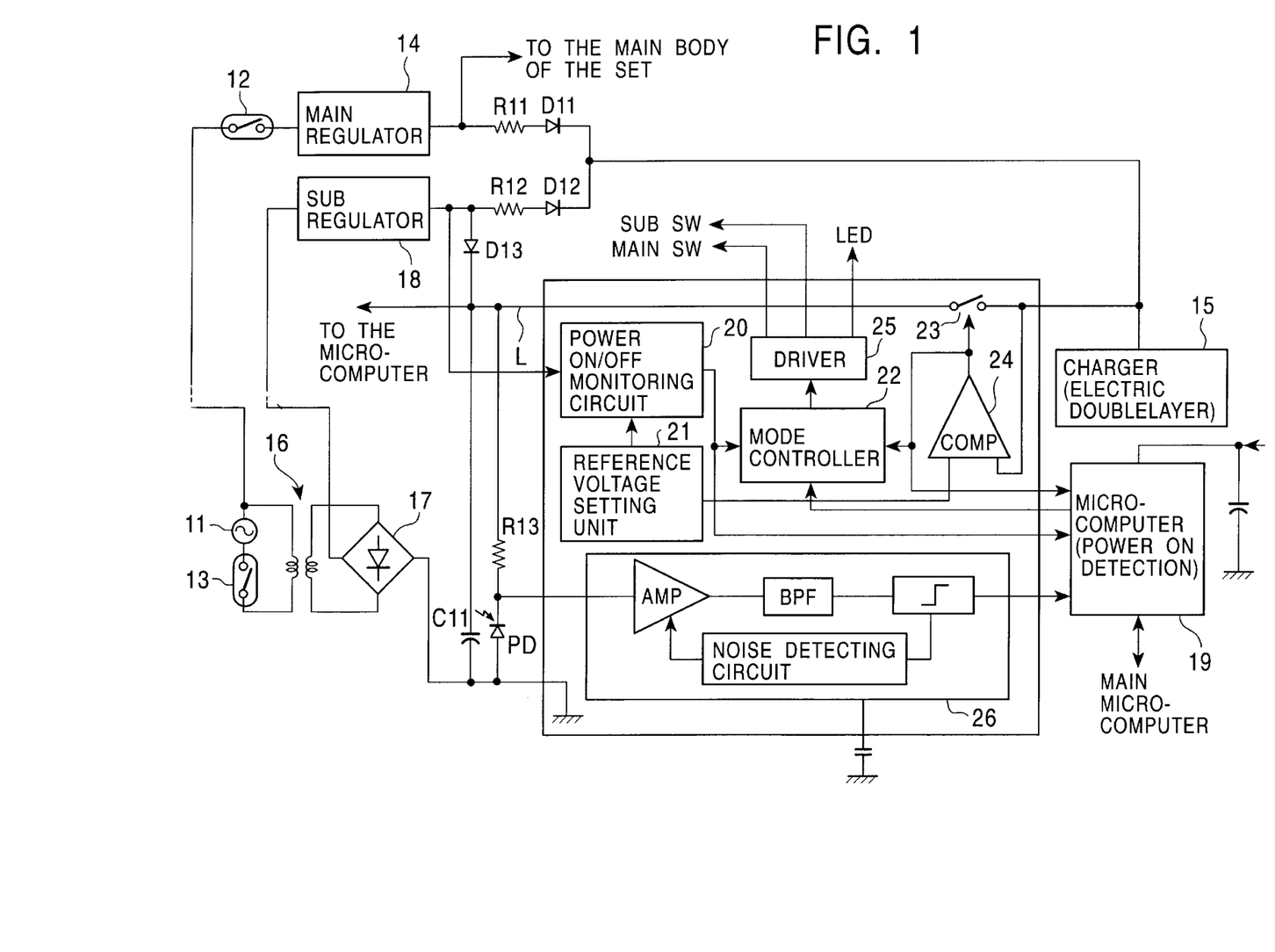
FIG. 1 is a block diagram showing an embodiment of the present invention in a case of being applied to a remote control receiving system.

Hereafter, attached drawings are referred while embodiments of the present invention are described in detail. FIG. 1 is a block diagram showing an embodiment of the present invention in a case of being applied to a remote control receiving system. The remote control receiving system of the present embodiment is built in, for example, a television receiver as its remote control receiving system. However, the system is not limited to be built in the television receiver, the system can be applied to all of the electronic apparatuses having a remote control function.

In FIG. 1, a main switch 12 and a sub switch 13 are connected to an AC power source 11 on both sides thereof in series, respectively. The main switch 12 is turned on and off by a relay. On the other hand, the sub switch 13 is manually tuned on and off, and also is turned on and off electrically by a relay or the like. However, a microcomputer 19, which will be described later, memorizes how the sub switch 13 was turned off.

An alternating voltage of the AC power source 11 outputted when the main switch 12 is turned on is supplied to a main regulator 14, and the main regulator 14 performs the voltage regulation of the alternating voltage. The output voltage of the main regulator 14 is supplied to the main body of the set (load) and a charger (for example, an electric double layer) 15 through a resistor R11 and a diode D11. As the charger 15, a secondary battery and the like can be used besides the electric double layer.

An alternating voltage of the AC power source 11 outputted when the sub switch 13 is turned on is decreased by a transformer 16, and then, is rectified by a rectifying circuit 17. The rectified voltage is then supplied to a sub regulator 18 to be regulated. The output voltage of the sub regulator 18 is supplied to the charger 15 through a resistor R12 and a diode D12.

The output voltage of the sub regulator 18 is further supplied to a power on/off monitoring circuit 20 directly. The power on/off monitoring circuit 20 monitors the output voltage of the sub regulator 18 to detect a rise or a fall (on or off) of the sub regulator 18 on the basis of whether or not the output voltage -exceeds a prescribed reference voltage set by a reference voltage setting unit 21. The detection results of the power on/off monitoring circuit 20 are supplied to the microcomputer 19 and a mode controller 22.

On the other hand, a charging switch 23 is connected between the microcomputer 19 being a load of the remote control receiving system, and the charger 15. The turning on and off of the charging switch 23 are controlled by a comparator 24. The comparator 24 detects the voltage of the charger 15, and functions as switch controlling means which turns on the charging switch 23 when the detected voltage reaches the prescribed reference voltage set by the reference voltage setting unit 21, and which turns off the charging switch 23 when the detected voltage is less than the reference voltage.

The detection results of the comparator 24 are supplied to the microcomputer 19 and the mode controller 22.

The mode controller 22 determines an operation mode on the basis of the control information from the microcomputer 19, the detection results of the power on/off monitoring circuit 20 and the detection results of the comparator 24, and drives the main switch 12 and the sub switch 13 to turn on or off through a driver 25 in accordance with the determined operation mode, and further drives a standby display device (LED) to emit a light or put out the light.

A diode D13 is connected between a power source line L from the output terminal of the charging switch 23 to the microcomputer 19 and the output terminal of the sub regulator 18. Moreover, a capacitor C11 is connected between the power source line L and the ground. Furthermore, a resistor R13 and a photodiode PD are connected in series between the power source line L and the ground.

The photodiode PD receives a remote controller signal light for turning on or off a power source. The information received by the photodiode PD is detected by a remote control receiving amplifier unit 26 and is supplied to the microcomputer 19. The microcomputer 19 has a built-in memory for storing the remote controller signals detected by the remote control receiving amplifier unit 26, and exchanges data with a main microcomputer, not shown, on the side of the main body of the system.

Next, the operation of each mode of the remote control receiving system in the aforesaid structure is described.

At first, the operation in a case of starting the system from a state that the voltage of the charger 15 is substantially 0 is described. First, when the sub switch 13 is manually turned on, the sub regulator 18 starts.

The start of the sub regulator 18 is detected by the power on/off monitoring circuit 20, and the power on/off monitoring circuit 20 supplies the detection result to the mode controller 22. Then, the mode controller 22 turns on the main switch 12 through the driver 25. As a result, the whole of the system starts.

When the sub switch 13 is manually turned off, the sub regulator 18 falls. At this time, the power on/off monitoring circuit 20 detects the fall of the sub regulator 18 to supply the detection result to the mode controller 22. Then, the mode controller 22 turns off the main switch 12 through the driver 25. As the result, the whole of the system falls.

Continuously, the operation when a power source off signal is inputted into the system from a remote controller is described. When the power source off signal is inputted into the system from the remote controller, the photodiode PD receives the signal to supply the information to the microcomputer 19 through the remote control receiving amplifier 26. At this time, the microcomputer 19 refers to the detection results of the comparator 24, and outputs to the mode controller 22 an instruction to turn off only the main switch 12 when the voltage of the charger 15 does not reach a desired value (reference voltage) set by the reference voltage setting unit 21 or an instruction to turn off both of the main switch 12 and the sub switch 13 when the voltage reaches the desired value.

As a result, by the control of the mode controller 22 through the driver 25, only the main switch 12 is turned off when the voltage of the charger 15 does not reach the desired value, and both of the main switch 12 and the sub switch 13 are turned off when the voltage reaches the desired value.

When the charged voltage of the charger 15 falls after the remote controller is turned off, the fall of the voltage is detected by the comparator 24, and the charging switch 23 is turned off by the detection output of the comparator 24. The detection output of the comparator 24 is also supplied to the microcomputer 19. Then, the microcomputer 19 supplies an instruction to turn on the sub switch 13 to the mode controller 22.

As a result, the sub switch 13 is turned on. Then, the sub regulator 18 starts. The start of the sub regulator 18 is detected by the power on/off monitoring circuit 20, and the detection result of the power on/off monitoring circuit 20 is supplied to the mode controller 22. At this time, the mode controller 22 recognizes that the start of the sub regulator 18 was done by the instruction of the microcomputer 19, and the mode controller 22 leaves the main switch 12 turned off.

Continuously, the operation when a power failure occurs or a plug socket is pulled out during charging is described.

When a power failure occurs or a plug socket is pulled out during charging, the sub regulator 18 falls and the power on/off monitoring circuit 20 detects the fall of the sub regulator 18 to supply the detection result to the microcomputer 19 and the mode controller 22. Then, the mode controller 22 turns off the sub switch 13 through the driver 25. Moreover, the microcomputer 19 changes its recorded state in its built-in memory from the remote control mode to the manual mode.

Figure 2:
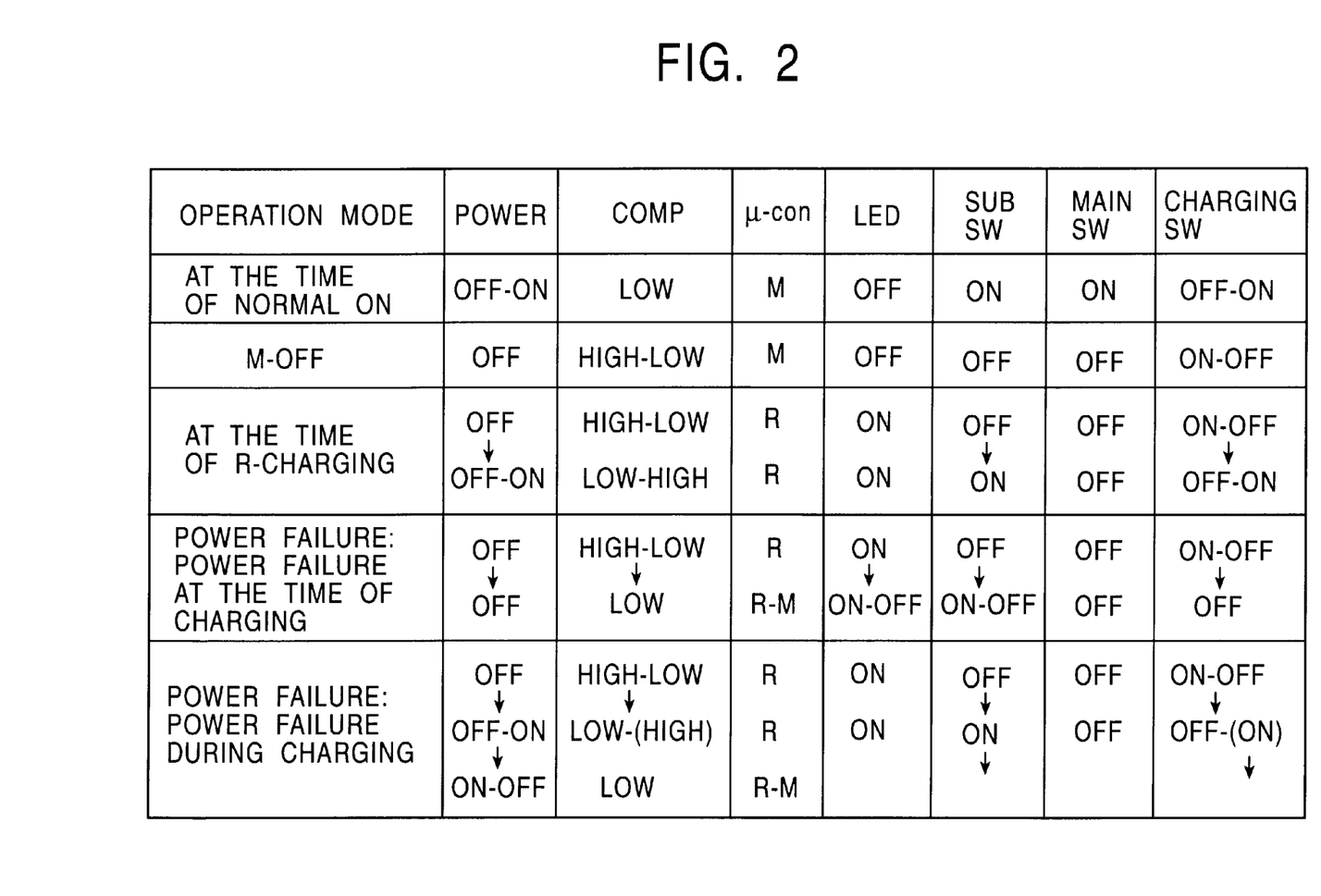
FIG. 2 is a table showing the operation of the embodiment shown in FIG. 1.

The summarization of the aforesaid operation is shown in FIG. 2.

In FIG. 2, "power" indicates detection states of the power on/off monitoring circuit 20; "COMP" indicates outputs of the comparator 24 ("low" means the low level, and "high" means the high level); "μ-con" indicates modes of the microcomputer 19 ("M" means the manual mode, and "R" means the remote control mode); "M-OFF" indicates the manual turning off; "AT THE TIME OF R-CHARGING" indicates a time of charging by an instruction from the remote controller.

As described above, the remote control receiving system of an electronic apparatus such as a television receiver has the structure in which the charger 15 is connected to the output terminal of the sub regulator 18 for driving a load such as the microcomputer 19 by using the AC power source 11 as an energy source and the charging switch 23 is connected between the load and the charger 15 to be controlled to turn on or off on the basis of the charged voltage in the charger 15. Consequently, because the load is driven by the voltage in the charger 15 when the charging switch 23 is tuned on, the consumption electric power on the side of the AC power source 11 can be suppressed.

In particular, because the sub switch 13 is connected in series to the AC power source 11 and the connection of the AC power source 11 to the AC primary side of the transformer 16 is cut by the sub switch 13 at the time of waiting an instruction from the remote controller, the consumption electric power on the side of the AC power source 11 can be made to be completely zero. Furthermore, because the AC primary side is cut off almost all of the time of waiting the instruction of the remote controller, there is no influence such as the disappearance of the contents in the memory at the time of thunderbolt or power failure.

Moreover, because the charger 15 can be charged by the main regulator 14 even when the charged voltage in the charger 15 is zero, the set can rapidly be turned on. If a case where an electric double layer, for example, is used as the charger 15 is considered, the period of time when the voltage of the electric double layer in storage capacity of 10[F] reaches 5[V] from 0[V] is 500 seconds (about 8 minutes) by a regulator that can flow a current of 100 [mA].

Figure 3:
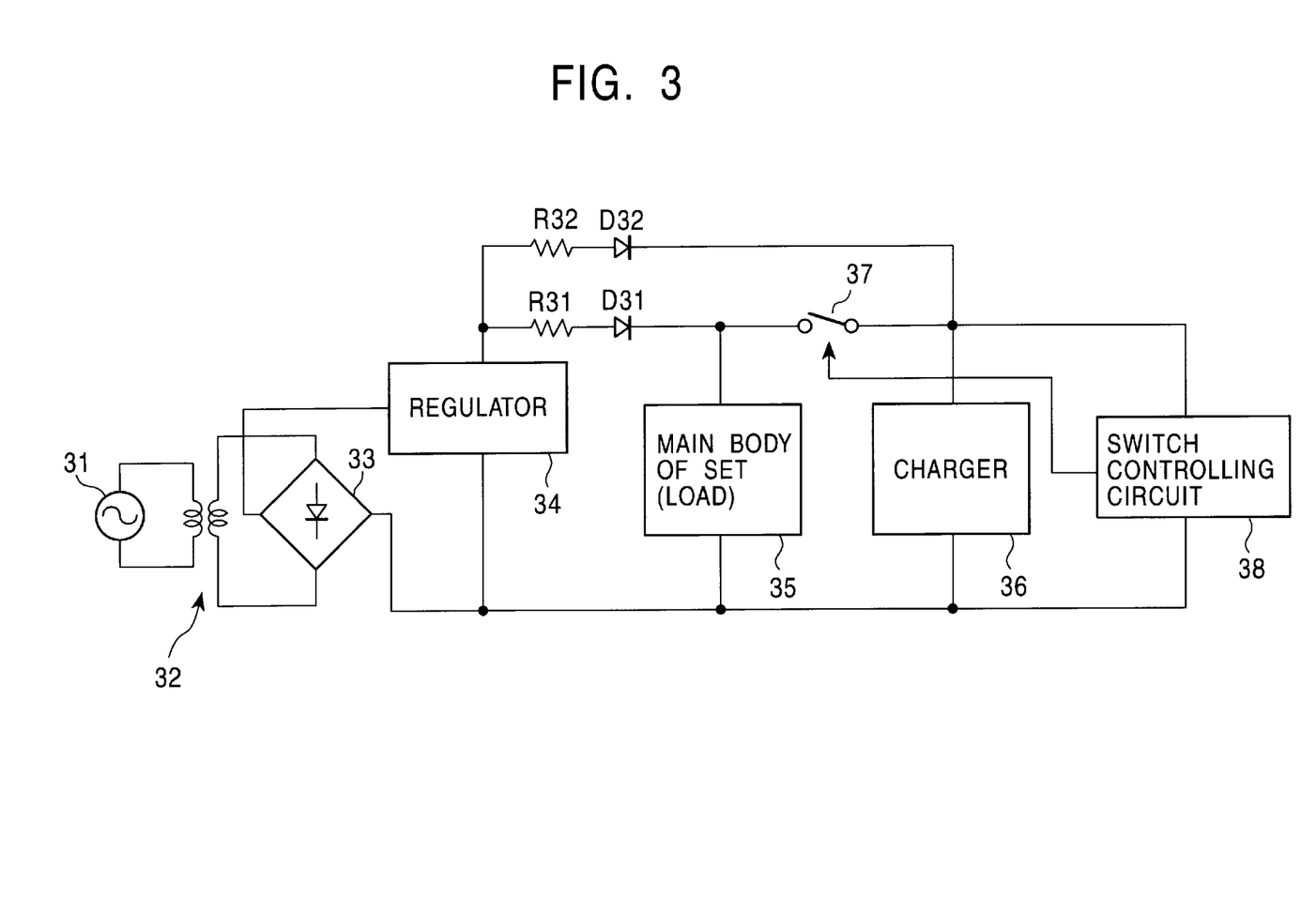
FIG. 3 is a block diagram showing another embodiment of the present invention in a case of being applied to an AC adapter system with a charging function.

FIG. 3 is a block diagram showing another embodiment according to the present invention in a case of being applied to an AC adapter system.

In FIG. 3, a power source voltage of an AC power source 31 is decreased by a transformer 32, and then is rectified by a rectifier 33 to be supplied to-a regulator 34. The regulator 34 regulates the supplied voltage. An output voltage of the regulator 34 is supplied to the main body of the set (load) 35 through a resistor R31 and a diode D31. The output voltage is further supplied to a charger 36 through a resistor R32 and a diode D32.

A charging switch 37 is connected between the main body of the set (load) 35 and the charger 36. The charging switch 37 is controlled to turn on or off by a switch controlling circuit 38. The switch controlling circuit 38 is comprised of a comparator or the like for monitoring the charged voltage in the charger 36. When the charged voltage reaches a prescribed voltage, the switch controlling circuit 38 turns on the charging switch 37. And when the charged voltage becomes less than the prescribed voltage, the switch controlling circuit 38 turns off the charging switch 37.

As mentioned above, the AC adapter system with a charging function has the structure in which the charging switch 37 is connected between the main body of the set 35 being a load and the charger 36 to be controlled to turn on or off by the switch controlling circuit 38 for monitoring the charged voltage in the charger 36. Consequently, because the main body of the set 35 is driven by the charged voltage in the charger 36 when the charging switch 37 is turned on, the consumption electric power on the side of the AC power source 31 can be suppressed.

Figure 5:
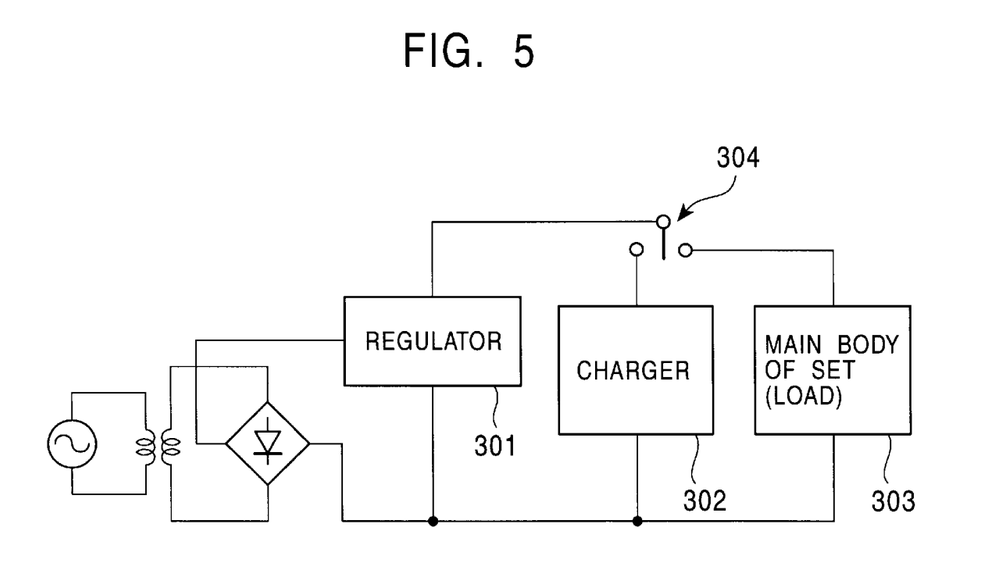
FIG. 5 is a block diagram showing a conventional AC adapter system with a charging function.
Figure 6:
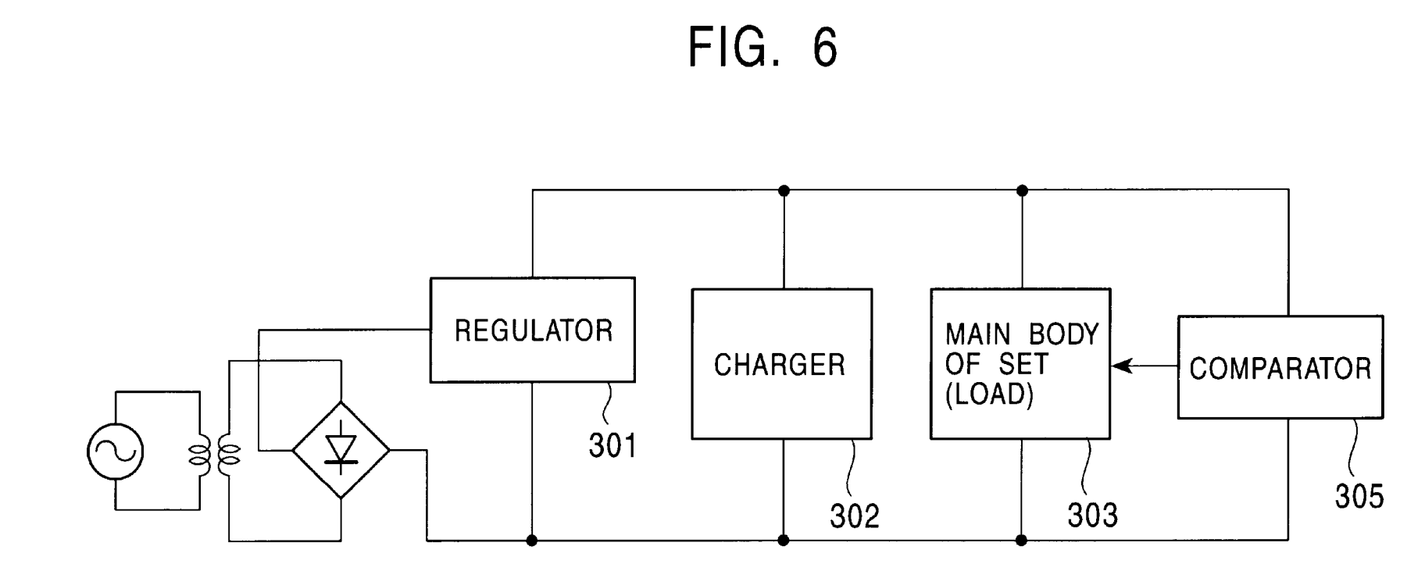
FIG. 6 is a block diagram showing another conventional AC adapter with a charging function.

In this connection, in the AC adapter system with the charging function, there is conventionally employed a structure, as shown in FIG. 5, in which a charger 302 and the main body of the set 303 are switched to be connected with an output terminal of a regulator 301 by changing a connector 304, or a structure, as shown in FIG. 6, in which the charger 302 and the main body of the set 303 are connected in parallel with the output terminal of the regulator 301 for monitoring the voltage of the charger 302 by means of a comparator 305 to operate the main body of the set 303 by the charged voltage in the charger 302 when the charged voltage is a prescribed voltage or more.

However, in the case of the former AC adapter system, because there is the necessity of changing the connector 304, the system is inferior in its convenience, and in the case of the latter AC adapter system, when the charged voltage in the charger 302 is low, the main body of the set 303 cannot be operated until the charged voltage becomes a voltage necessary for the system and consequently the latter system has a defect in rapid response.

On the contrary, in the AC adapter system according to the present embodiment, because the charging switch 37 is provided to be controlled to turn on or off automatically on the basis of the charged voltage in the charger 36 by the switch controlling circuit 38, the AC adapter system is superior in its convenience, and because the main body of the set 35 is driven by the output voltage of the regulator 34 when the charged voltage in the charger 36 is low, the AC adapter system is also superior in its rapid response.

Although the invention has been described in its preferred form with a certain degree of particularity, obviously many changes and variations are possible therein. It is therefore to be understood that the present invention may be practiced than as specifically described herein without departing from scope and the sprit thereof.

What is claimed is:

1. An electronic apparatus comprising:
   a regulator for driving a load connected to an output terminal of said regulator by using an AC power source as an energy source;
   a charger connected to an output terminal of said regulator;
   a charging switch connected between said load and said charger; and
   switch controlling means for monitoring a charged voltage in said charger to turn on said charging switch when the charged voltage reaches a prescribed voltage and turn off said charging switch when the charged voltage becomes less than the prescribed voltage.

2. The electronic apparatus according to claim 1, further comprising:
   switching means for controlling said regulator to turn on or off, said switching means connected between said AC power source and said regulator,
   wherein:
   said switching means is able to be turned on or off either electrically or manually.

3. The electronic apparatus according to claim 1, further comprising:
   a remote control receiving unit for detecting a remote control signal for turning on or off said AC power source;
   a controlling unit having a memory for storing the remote control signal detected by said remote control receiving unit; and
   a monitoring circuit for monitoring a rise and a fall of said regulator to supply a detection result of the rise and the fall to said controlling unit,
   wherein:
   said controlling unit changes a memorized state from a remote control mode to a manual mode when a power failure occurs or an AC plug socket is pulled out during operation of charging said charger.

* * * * *

UNITED STATES PATENT AND TRADEMARK OFFICE
CERTIFICATE OF CORRECTION

PATENT NO. : 6,384,577 B1
DATED : May 7, 2002
INVENTOR(S) : Masafumi Kikuchi et al.

It is certified that error appears in the above-identified patent and that said Letters Patent is hereby corrected as shown below:

<u>Title page,</u>
Item [73], should read -- [73] Assignee: Sony Corporation. Japan. --

Signed and Sealed this

Twenty-sixth Day of November, 2002

Attest:

*Attesting Officer*

JAMES E. ROGAN
*Director of the United States Patent and Trademark Office*